United States Patent
Faller et al.

(10) Patent No.: US 9,503,879 B2
(45) Date of Patent: Nov. 22, 2016

(54) METHOD FOR SERVING VISITOR SUBSCRIBERS IN A MOBILE COMMUNICATION SYSTEM

(71) Applicant: IPCO AS, Halden (NO)

(72) Inventors: Torbjoern Faller, Skedsmokorset (NO); Olaf Valeur, Oslo (NO); Rolf Roesok, Raade (NO)

(73) Assignee: IPCO AS, Halden (NO)

( * ) Notice: Subject to any disclaimer, the term of this patent is extended or adjusted under 35 U.S.C. 154(b) by 0 days.

(21) Appl. No.: 14/652,073

(22) PCT Filed: Dec. 13, 2013

(86) PCT No.: PCT/EP2013/076562
§ 371 (c)(1),
(2) Date: Jun. 12, 2015

(87) PCT Pub. No.: WO2014/090997
PCT Pub. Date: Jun. 19, 2014

(65) Prior Publication Data
US 2015/0319603 A1 Nov. 5, 2015

Related U.S. Application Data

(60) Provisional application No. 61/737,711, filed on Dec. 14, 2012.

(30) Foreign Application Priority Data

Dec. 14, 2012 (NO) .................................. 20121518

(51) Int. Cl.
*H04W 8/06* (2009.01)
*H04W 12/06* (2009.01)
*H04W 8/18* (2009.01)
*H04W 4/02* (2009.01)
*H04W 8/00* (2009.01)
*H04W 84/04* (2009.01)

(52) U.S. Cl.
CPC ................ *H04W 8/06* (2013.01); *H04W 4/02* (2013.01); *H04W 8/00* (2013.01); *H04W 8/18* (2013.01); *H04W 12/06* (2013.01); *H04W 84/042* (2013.01)

(58) Field of Classification Search
CPC ............ H04W 8/18; H04W 8/06; H04W 8/02; H04L 12/66
See application file for complete search history.

(56) References Cited

U.S. PATENT DOCUMENTS

| 2003/0064723 | A1 | 4/2003 | Thakker | |
| 2008/0092212 | A1* | 4/2008 | Patel | H04L 12/66 726/3 |
| 2012/0282924 | A1* | 11/2012 | Tagg | H04W 8/18 455/432.1 |

FOREIGN PATENT DOCUMENTS

| WO | 2009/015273 A2 | 1/2009 |
| WO | 2009/042048 A2 | 4/2009 |
| WO | 2011/036484 A2 | 3/2011 |

OTHER PUBLICATIONS

"3rd Generation Partnership Project; Technical Specification Group Services and System Aspects; System improvements for Machine-Type Communications (MTC) (Release 11)", 3GPP Standard; 3GPP TR 23.888, 3rd Generation Partnership Project (3GPP), Mobile Competence Centre; 650, Route Des Lucioles; F-06921 Sophia-Antipolis Cedex; France, vol. SA WG2, No. V11.0.0, Sep. 18, 2012, pp. 1-165, XP050649142,[retrieved on Sep. 18, 2012] section 6.9.

(Continued)

*Primary Examiner* — Myron K Wyche
(74) *Attorney, Agent, or Firm* — Kilpatrick Townsend & Stockton LLP

(57) ABSTRACT

A method for serving visitor subscribers in a mobile communication system has been disclosed. The method, which is performed by a virtual visitor subsystem, VSS, included in the mobile communication system, comprises the following steps: detecting a roaming event on an MSISDN of a (Continued)

mobile station, MS, operating in the mobile communication system; determining a mobile network operator in the mobile communication system, having an HPLMN which covers a geographic area of the MS, to be a visitor mobile network operator of the MS; receiving a visitor IMSI from the visitor mobile network operator; assigning the visitor IMSI to the MSISDN of the MS; transmitting the visitor IMSI to the MS; intercepting an authentication initiation towards the visitor mobile network operator; authenticating the MS towards a home mobile network operator of the MS; and activating a visitor subscription identified by the visitor IMSI based on an authentication response received from the home mobile network operator.

19 Claims, 15 Drawing Sheets

(56) References Cited

OTHER PUBLICATIONS

International Search Report mailed Mar. 28, 2014, from International Application No. PCT/EP2013/076562 (13 pages).
International Preliminary Report on Patentability mailed Dec. 16, 2014, from International Application No. PCT/EP2013/076562 (21 pages).

* cited by examiner

METHOD FOR SERVING VISITOR SUBSCRIBERS IN A MOBILE COMMUNICATION SYSTEM

CROSS-REFERENCE TO RELATED APPLICATIONS

This application is a U.S. National Phase of International Application No. PCT/EP2013/076562, filed Dec. 13, 2013, which claims priority to U.S. Provisional Patent Application No. 61/737,711, filed Dec. 14, 2012, and claims priority to Norwegian Patent Application No. 20121518, filed Dec. 14, 2012, the disclosures of which are incorporated by reference herein.

FIELD OF THE INVENTION

The present invention relates in general to communication systems. More specifically, the invention relates to a method for serving visitor subscribers in a mobile communication system. The invention also relates to a visitor serving subsystem which employs the method, and a mobile communication system which includes such a visitor serving subsystem.

BACKGROUND OF THE INVENTION

Subscribers visiting a foreign country are granted access to the mobile network in the visited country through roaming agreements. A roaming agreement is a mutual agreement between two mobile network operators; the home network operator (Home Mobile Network Operator, HMNO) and the visited network operator (Visited Mobile Network Operator, VMNO). A mobile operator must sign a large number of roaming agreements in order to offer global coverage for their subscribers. As an alternative to sign roaming agreements with operators in all countries around the globe, a mobile operator can buy roaming through Roaming Hub.

The roaming business is controlled by the telecom operators in the GSMA. Mobile Virtual Network Operators (MVNOs) and new network operators that relies on the infrastructure provided by MNOs, have no or limited possibilities to get their share of the profit from roaming.

Background art mainly focuses on the visitor situation from the subscribers' side. Numerous methods and technologies for roaming subscribers and multiple subscriptions exist. Commercially available products in this category are called Roaming SIM Cards, or Multi-IMSI SIM Cards.

SUMMARY OF THE INVENTION

Advantages over the background art are provided by a method for serving visitor subscribers, a visitor serving subsystem and a mobile communication subsystem as set forth in the appended independent claims.

Advantageous and alternative embodiments are set out in the dependent claims.

Additional features, principles and advantages of the present invention will be recognized from the detailed description below. It is to be understood that both the foregoing general description and the following detailed description are exemplary and explanatory only and are not restrictive of the invention, as claimed.

DETAILED DESCRIPTION OF THE INVENTION

The invention will be described by exemplary embodiments in the following detailed description.

The present invention provides a method for serving visitor subscribers in a mobile communication system.

Such a mobile communication system may be considered as a structural environment in which the method for serving visitor subscribers may operate. Structurally, the mobile communication system may comprise a plurality of mobile stations, MS. Each mobile station or at least some of the mobile stations operating in the system includes a SIM which includes an application program to be executed by a processing device in the SIM.

The mobile communication system further includes a plurality of mobile network operators, which may include MVNOs and MNOs. Each mobile network operator included in the system, or at least some of the mobile network operators, are configured with a pool of visitor subscriptions. Each visitor subscription is identified with a visitor IMSI.

The mobile communication system further includes a plurality of home public land mobile networks, HPLMNs. Each of the HPLMNs, or at least some of the HPLMNs, may be associated with a corresponding mobile network operator. Moreover, each HPLMN may be configured to determine a geographic area of an MS operating in the HPLMN.

The mobile communication system may further include a plurality of visitor public land mobile networks, VPLMNs, associated with a roaming hub.

Further, the mobile communication system further includes a visitor serving subsystem, VSS, which is configured to operate in accordance with principles of the method for serving the visitor subscribers in the mobile communication system.

Typically, the VSS includes a processing device which is configured to execute computer processing instructions which causes the VSS to perform the disclosed method for serving the visitor subscribers.

Figure 4:
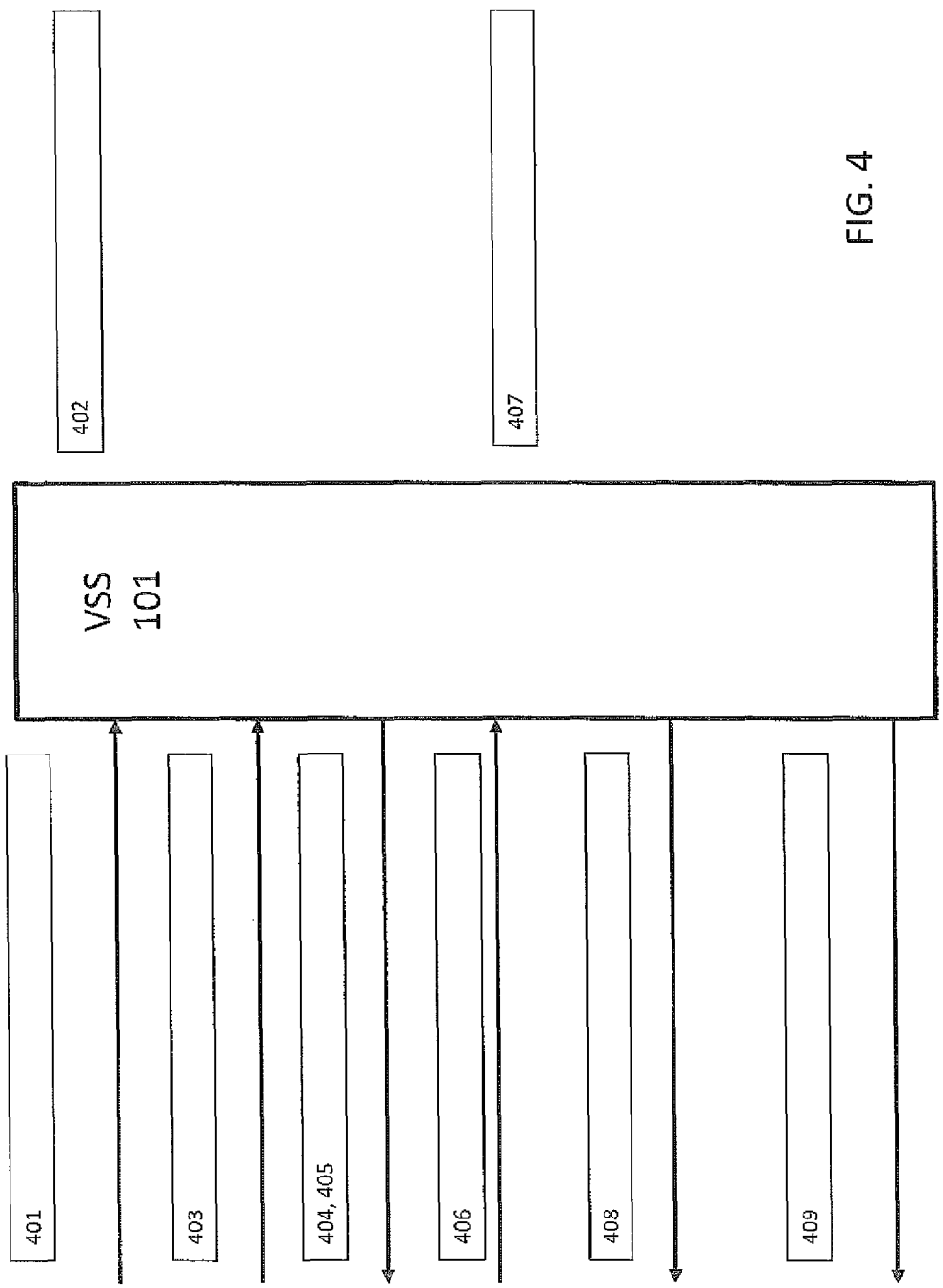
FIG. 4 is a schematic process flow diagram illustrating the various steps performed by a virtual visitor subsystem, VSS.

Hence, the disclosed method for serving the visitor subscribers will be performed by the visitor serving subsystem, VSS. The method is illustrated in FIG. 4 and comprises the following steps:

- detecting a roaming event on an MSISDN of an MS (a mobile station) which operates in the mobile communication system (step 401),
- determining a visitor mobile network operator as a mobile network operator having an HPLMN covering the geographic area of the MS (step 402),
- receiving a visitor IMSI from the visitor mobile network operator (step 403),
- assigning the visitor IMSI to the MSISDN of the MS (step 404),
- transmitting the visitor IMSI to the MS (step 405),
- receiving an authentication request (step 406),
- intercepting an authentication initiation towards the visitor mobile network operator (step 407),
- authenticating the MS towards the home mobile network operator of the MS (step 408), and
- activating a visitor subscription identified by the visitor IMSI based on an authentication response received from the home mobile network operator (step 409).

The roaming event on an MSISDN of an MS may, in an exemplary aspect, be identified by the VSS 101 receiving a MAP Update Location message from a roaming hub in the mobile communication system when the MS is connected to a visitor public land mobile network (VPLMN).

Alternatively, the roaming event on an MSISDN of an MS may e.g. be identified by the VSS 101 receiving a MAP Update Location message from the roaming hub when the MS is connected to the home public land mobile network (HPLMN).

Alternatively, the roaming event on an MSISDN of an MS may e.g. be identified by the VSS 101 receiving a MAP Cancel Location message from the home mobile operator of the MS when the MS is connected to the home public land mobile network (HPLMN).

The method may identify the roaming event by any one, or any combination, of the above occasions or conditions.

The step 402 of determining a visitor mobile operator as a mobile network operator having a HPLMN covering the geographic area of the MS may, in an exemplary aspect, include using a VLR number in the roaming event.

The step 404 of assigning the visitor IMSI to the MSISDN may, in an exemplary aspect, include selecting a free visitor IMSI from a visitor subscription pool which is included in (e.g., stored in), or has been retrieved from, the visitor mobile network operator.

The step 405 of transmitting the visitor IMSI to the MS may, in an exemplary aspect, include direct transfer of the service SMS to the MS without involving the home operator SMSC. The transmitting step 405 may further include updating a SIM included in the MS with the visitor IMSI. This may be performed by using SIM OTA and visitor applet in the MS, i.e., by employing an application program executed by a processing device in the SIM.

The step 407 of intercepting authentication towards the home mobile network operator may, in an exemplary aspect, include intercepting and routing, by the VSS 101, an authentication request 406 towards the home network operator and the visitor network operator, intercepting, by the VSS, an authentication response received from the home network operator and the visitor network operator, and transferring, by the VSS 101, the authentication response from the home network operator towards the VLR that requested the authentication.

The step 409 of activating the visitor subscription identified by the visitor IMSI may, in an exemplary aspect, include activating the visitor subscription based on an authentication response received from the home mobile network operator.

In an advantageous aspect, the method for serving visitor subscribers further includes performing a mapping between the visitor IMSI and a home IMSI of the MS. The method may advantageously further include performing a further mapping between a visitor MSISDN and an MSISDN of the MS.

The method for serving visitor subscribers, in particular such a method which includes the mapping between the visitor IMSI and a home IMSI and a further mapping between a visitor MSISDN and an MSISDN of the MS.

The method for serving visitor subscribers may further include a number of optional additional steps.

One such optional additional step includes transferring a mobile originated SMS sent from the MS and received by the home mobile network operator's SMSC.

An alternative optional additional step includes transferring a mobile terminated SMS sent from the home mobile network operator's SMSC and received by the MS.

Still another alternative optional additional step includes transferring a mobile originated MMS sent by the visitor mobile network operator's MMSC and received by the home mobile network operator MMSC.

An additional step may further include adding routing prefixes to a B-number for transfer of mobile originated calls generated by a visitor assigned a visitor subscription to the home mobile network operator GMSC for call handling. In this aspect the VSS, performing the method, is utilized as an IN node.

Yet another possible additional step may include adding routing prefixes to a roaming number for routing of mobile terminated calls towards the visitor mobile network operator, utilizing the MSISDN of the visitor subscription as the roaming number.

The method may, in another optional step, further include transfer of voice billing data (MOC CDR) received from the visitor mobile network operator.

The method may further include transfer of SMS billing data (SMS-MO CDR/S-SMO-CDR) received from the visitor mobile network operator.

Optionally the method may further include transfer of MMS billing data (MO MMS CDR) received from the visitor mobile network operator.

The method may further include transfer of GPRS billing data (M-, S- and G-CDR) sent from the visitor mobile network operator.

The invention also relates to a visitor serving subsystem, VSS 101, for serving visitor subscribers in a mobile communication system. The VSS 101 includes a processing device which is configured to perform a method as disclosed herein.

The invention also relates to a mobile communication system, which comprises a plurality of mobile stations, MS, each including a SIM, the SIM including an application to be executed by a processing device in the SIM; a plurality of mobile network operators, including MVNOs and MNOs; each configured with a pool of visitor subscriptions, each visitor subscription being identified with a visitor IMSI; a plurality of home public land mobile networks, HPLMNs, each associated with a corresponding mobile network operator, each HPLMN being configured to determine a geographic area of an MS operating in the HPLMN; and a plurality of visitor public land mobile networks, VPLMNs, associated with a roaming hub; and a visitor serving subsystem, VSS 101 as disclosed herein, i.e., a VSS which includes a processing device configured to perform a method as disclosed herein.

As a result of the present invention, a home operator subscriber visiting a foreign country can be assigned a visitor subscription from a local mobile network operator in the foreign country.

The subscriber may be authenticated by the home operator and may use the visitor subscription from the local operator for accessing the local PLMN. Seen from the home operator the subscriber is roamed. Seen from the local operator the visitor is treated as a local subscriber.

Architecture

The present invention provides a method for enabling Mobile Virtual Network Operators (MVNOs) to provide visitor functionality. The visitors are in this context called Virtual Operator Visitors (VOVs and the system implementing the method is called Visitor Serving Subsystem (VSS). In order to show that this method represents a new invention, this description will first explain the prior art and current situations.

Figure 1:
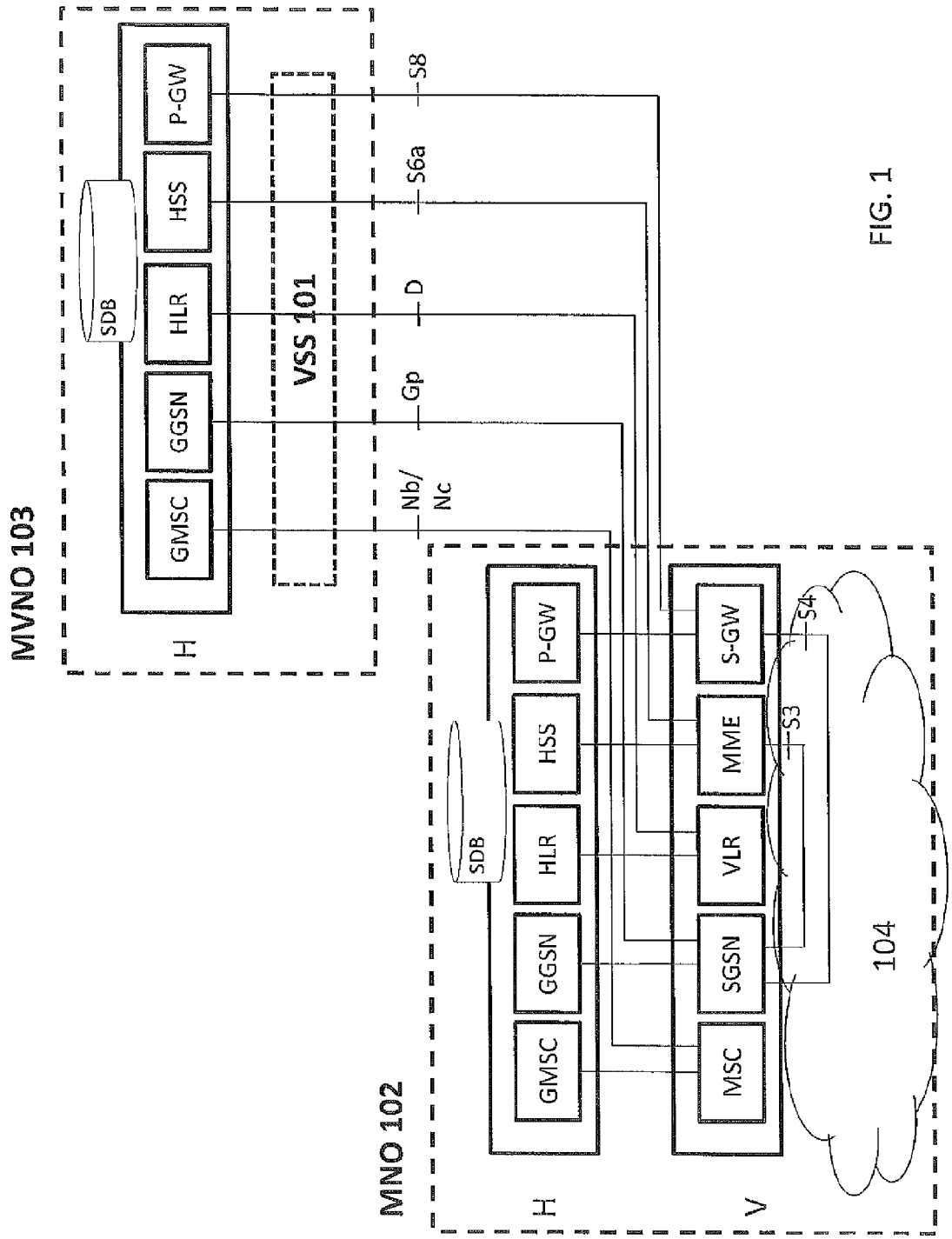
FIG. 1 is a schematic block diagram illustrating network elements for MNOs and MVNOs, which includes a visitor serving subsystem.

FIG. 1 shows the core networks elements for MNOs 102 and MVNOs 103. The core network consists of two different layers labelled "H" and "V" in the figure. The H-layer is related to the operator's subscribers and gateways to public networks. The figure shows the different interfaces between these layers. The V-layer is connected to the radio network 104 and has a serving function towards the H-layer. The V-layer can be attached to subscribers belonging to different operators, and these subscribers are authenticated by means of the H-layer. MNOs have both types of layers, but MVNOs have only the H-layer. The subscribers belonging to an MVNO are attached an MNO's V-layer and will be authenticated by the MVNO's H-layer. The VSS will serve as a V-layer for an MVNO. It will make it possible for MVNOs to host visitors. In both MNO 02 and MVNO 103, SDB denotes a subscriber database.

MVNOs must buy their roaming service through the local MNO. Roaming is controlled by the MNOs. An example is shown in FIG. 2, part a.

Figure 2B:
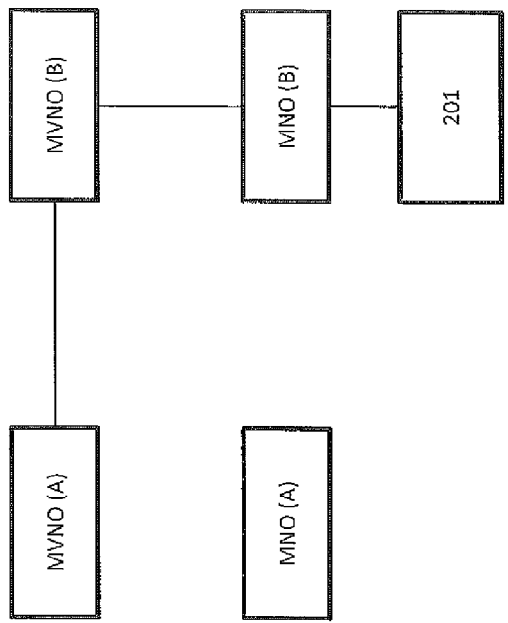
FIG. 2 is a schematic block diagram illustrating roaming control aspects of MVNOs.
FIG. 2a is without a visitor serving subsystem while FIG. 2b includes a visitor serving subsystem.
Figure 2A:
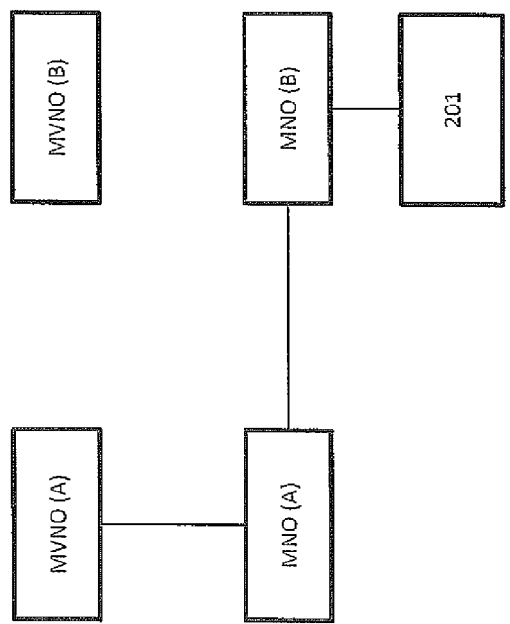

FIG. 2a shows an MVNO subscriber (a subscriber from MVNO (A) in this case) has roamed to another MNO in a foreign country (MNO (B) in this case). The current GSMA regime allows only MNO (A) and MNO (B) to be involved in this roaming. The MVNO abroad, the MVNO (B) has no possibility to see the MVNO (A) subscriber as a visitor. Hence, MVNO(B) is not involved.

FIG. 2, part b shows how this can be changed by introducing VSS. VSS will establish a separate roaming service for exchange of visiting subscribers directly between MVNOs.

Figure 3:
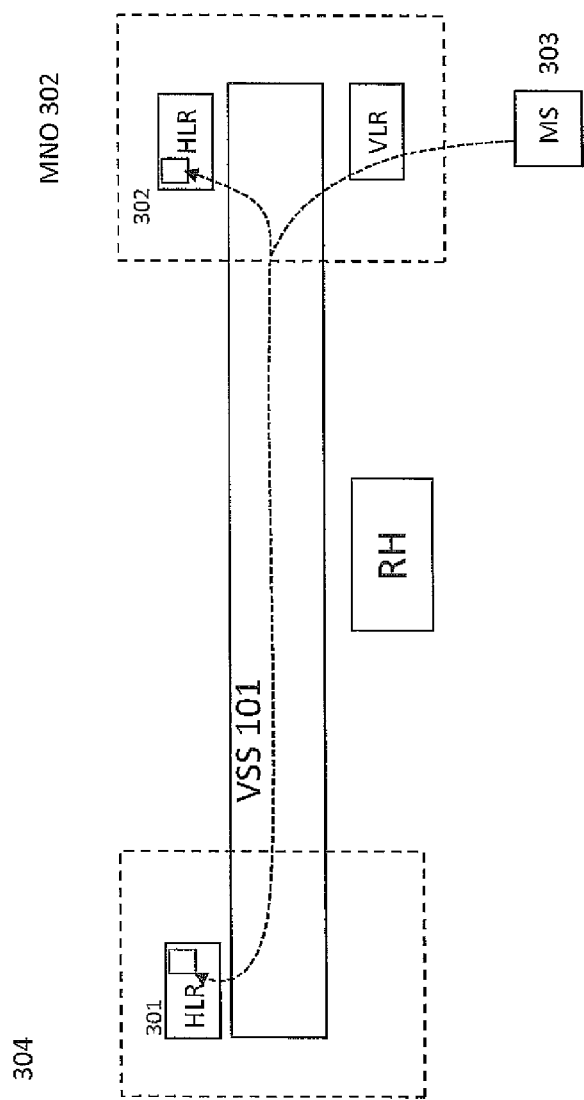
FIG. 3 is a schematic block diagram illustrating aspects of a method for serving visitors by MNOs using a visitor serving subsystem.

In both FIGS. 2a and 2b, 201 denotes a visitor belonging to MVNO(A). FIG. 3 illustrates how the VSS 101 can be used for an MNO. In this case the MNO is serving a visitor, but unlike ordinary roaming the MNO will activate a local visitor subscription. VSS 101 maintains the relationship between the visitor and home subscription. In FIG. 3, 304 denotes a home operator and 302 denotes a mobile network operator MNO.

FIG. 4 has already been described above.

Figure 5:
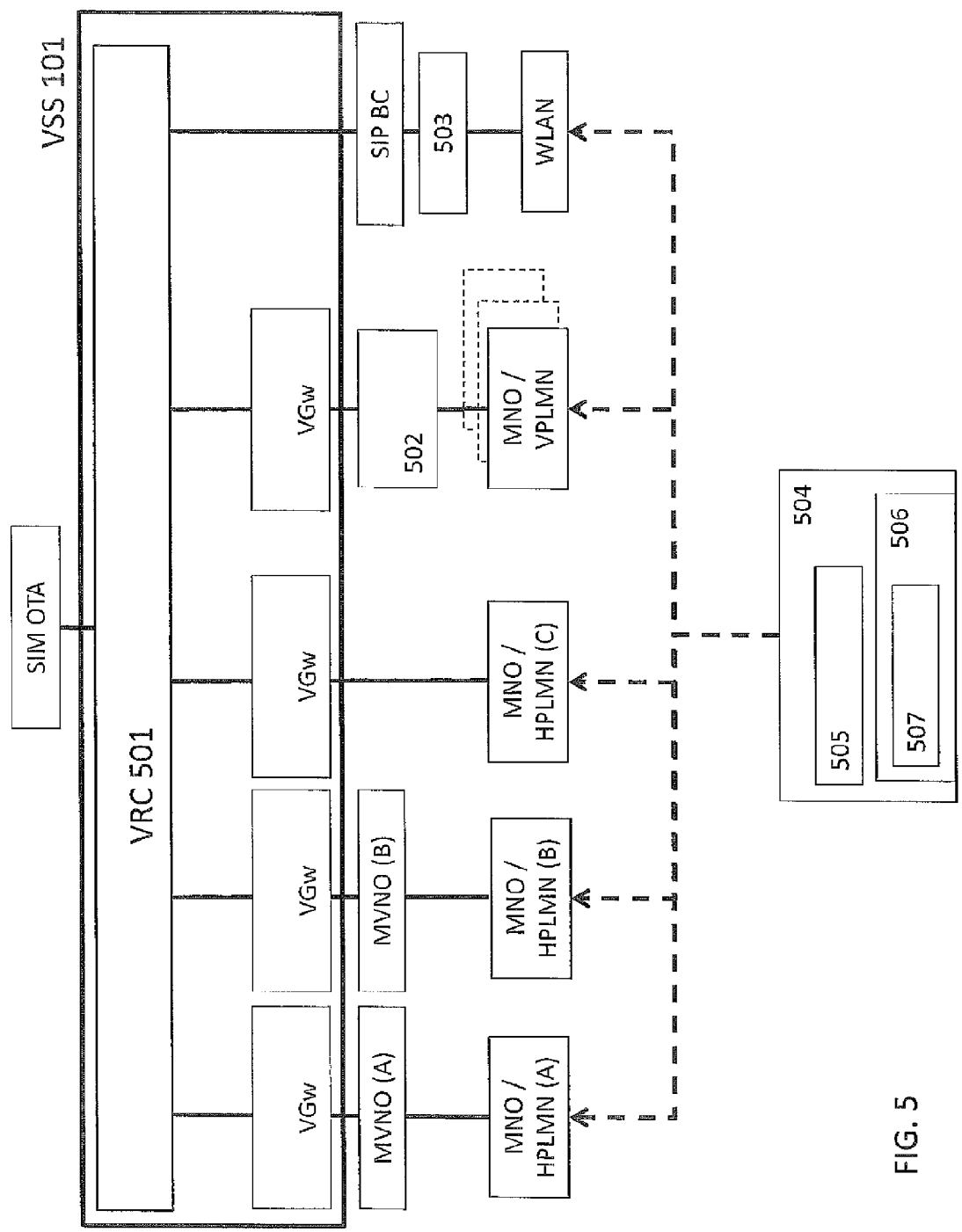
FIG. 5 is a schematic block diagram illustrating the visitor serving subsystem architecture.

FIG. 5 presents the component view of the VSS architecture. The components are:

The Visitor Applet 507 is a software module on the SIM card 506.

The SIM card 506 is a component in the MS 504.

The Visitor SIP client 505 is a software component in the MS 504.

A number of MNOs/PLMNs connected to a number of MVNOs and a Roaming hub 502.

The visitor gateways, VGws, are software and hardware components connected to the MVNO's core network.

The VRC 501 is a software and hardware component connected to all the VGws, the SIP BC (Boarder Controller) and the SIM OTA.

VOV MVNOs will form a network through the VRC. The VRC will be used for routing of location management, calls and messages, thus bypassing the global SS7 network used by the MNOs for roaming.

Each VOV MVNO will act as H-MVNO for his own subscribers on travel. Each VOV MVNO will act as V-MVNO for subscribers from other MVNOs visiting his area of coverage.

Visitor routing centre, VRC 501, will ensure global coverage through the integration of a roaming hub for areas not covered by VOV MVNOs. VOV will make use of a common mobile operator identity for roaming through the roaming hub. MVNOs that are only granted national access through their MVNO agreement with the local MNO can get global coverage through the VSS network. MNOs struggling to get competitive roaming prices can take the advantage of the VSS network in a similar way as for the MVNOs.

Mobile operators without own roaming agreements can take the advantage of a roaming partner in order to cover all areas that is not covered by the operators using VSS services.

Smart-phones with WLAN interface can access Internet 503 via WLAN hotspots at home, in offices, hotels, public areas, etc. A large number of WLAN profiles can be stored in the smart-phone and the smart-phone can automatically detect that the terminal is within coverage of a known WLAN and then start to direct the data flows towards the WLAN. The Visitor SIP client installed on a smart-phone will make use of the Internet access. The SIP client will direct the calls via the WLAN.

Virtual Operator Visitor

A visitor subscriber is a mobile subscriber using a PLMN from another MNO than his H-MNO. We call this operator the V-MNO. The visitor will be inserted in the V-MNO's VLR based on an authentication towards the H-MVNO's HLR. Prior to the acceptance of a visitor, there has to be a commercial agreement between the H-MNO and the V-MNO. There are mainly three types of agreements: roaming agreement between mobile network operators from different countries, national roaming agreement between operators in the same country and virtual operator agreement providing subscribers from a MVNO national mobile coverage through the MNO's PLMN.

The Mobile Virtual Operator Visitor Solution takes the mobile operator visitor concept one step further by introducing Virtual Operator Visitors (VOV). A VOV will be provided a temporary local subscriber identity from the V-MVNO. The VOV will keep his original mobile telephone number from his home operator and continue to receive mobile subscription services from his home operator.

Figure 6:
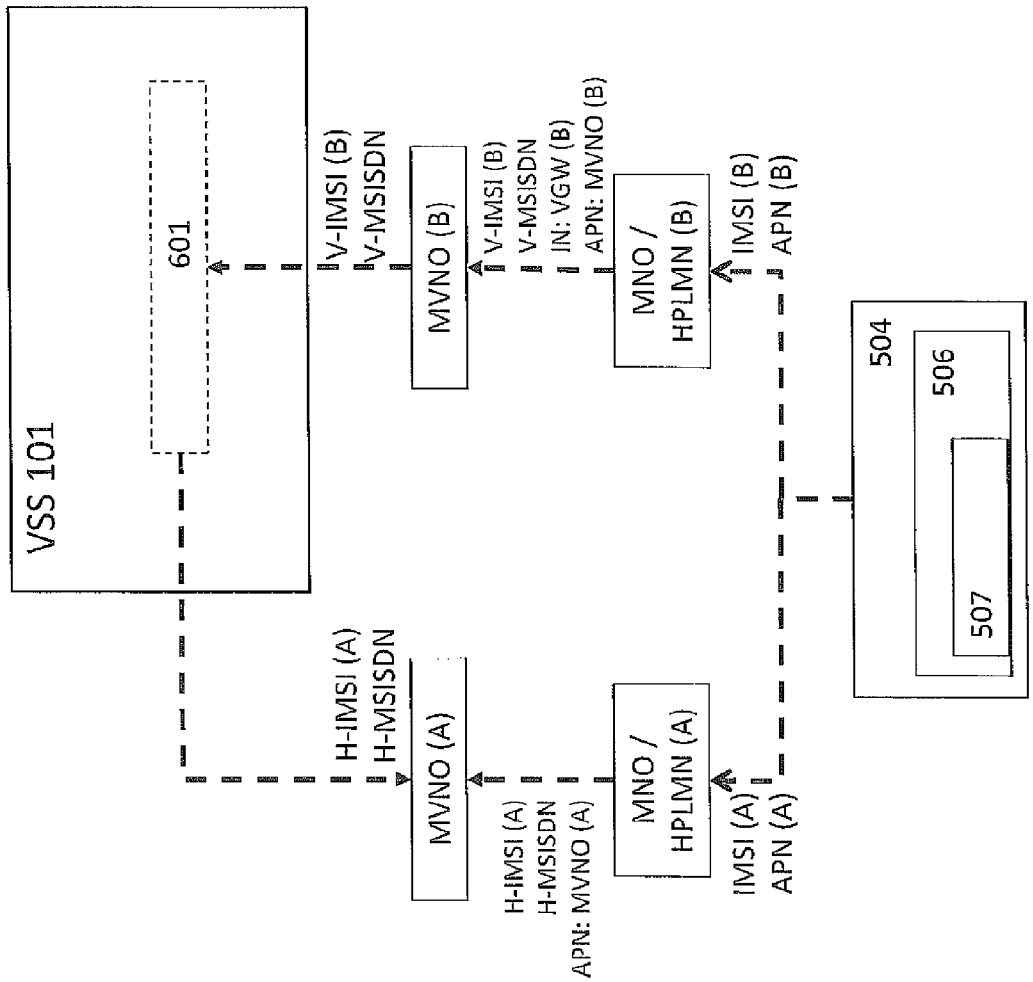
FIG. 6 is a schematic block diagram illustrating aspects of a method for serving visitor subscribers, in particular the mapping of visitor subscriptions.

FIG. 6 further illustrates the method for managing VOVs. Here, the MS 504 still has a local subscription with the MVNO (A) and roaming utilizes a visitor subscription from MVNO (B) with a subscriber profile including V-IMSI, V-MSISDN, IN service activation with the VGw as the IN node, and the APN address of the V-MVNO for accessing the H-PLMN of the V-MVNO.

A VOV travelling to a foreign country will be registered as a local MVNO subscriber in the visited MNO. VOV subscribers with the Visitor Applet 507 on their SIM-cards 506 will automatically receive VOV services from the local MVNO. The MS will make use of the temporary allocated subscriber identity and thus act as a local subscriber. The VOV subscriber generates local traffic and revenue for the MVNO (B). Under the legacy roaming regime, this traffic was supposed to be roaming traffic revenue for the MNO/HPLMN (B). The traffic generated by the visiting subscriber appears to be generated by a customer of the MVNO (B).

VRC 501, which is included in VSS 101, will manage the dynamic allocation of visitor subscriptions and the visitor subscription mapping 601 between the home operator subscriber identity and the visitor subscription. The VOV will receive all his mobile phone subscription services from his home operator and is available for incoming calls on his own mobile telephone number. The temporary V-MSISDN assigned by the V-MVNO will be replaced with the real mobile telephone number before calls and messages are routed towards the called telephone number. Emergency calls will use the V-MSISDN in order to ensure that emergency calls are directed towards the local emergency service.

VRC will ensure global coverage through the integration of a roaming hub for areas not covered by VOV MVNOs. VOV will make use of a common mobile operator identity for roaming through the roaming hub. MVNOs that are only granted national access through their MVNO agreement with the local MNO can get global coverage through the VOV network. MNOs struggling to get competitive roaming prices can take the advantage of the VOV network in a similar way as for the MVNOs.

Figure 7:
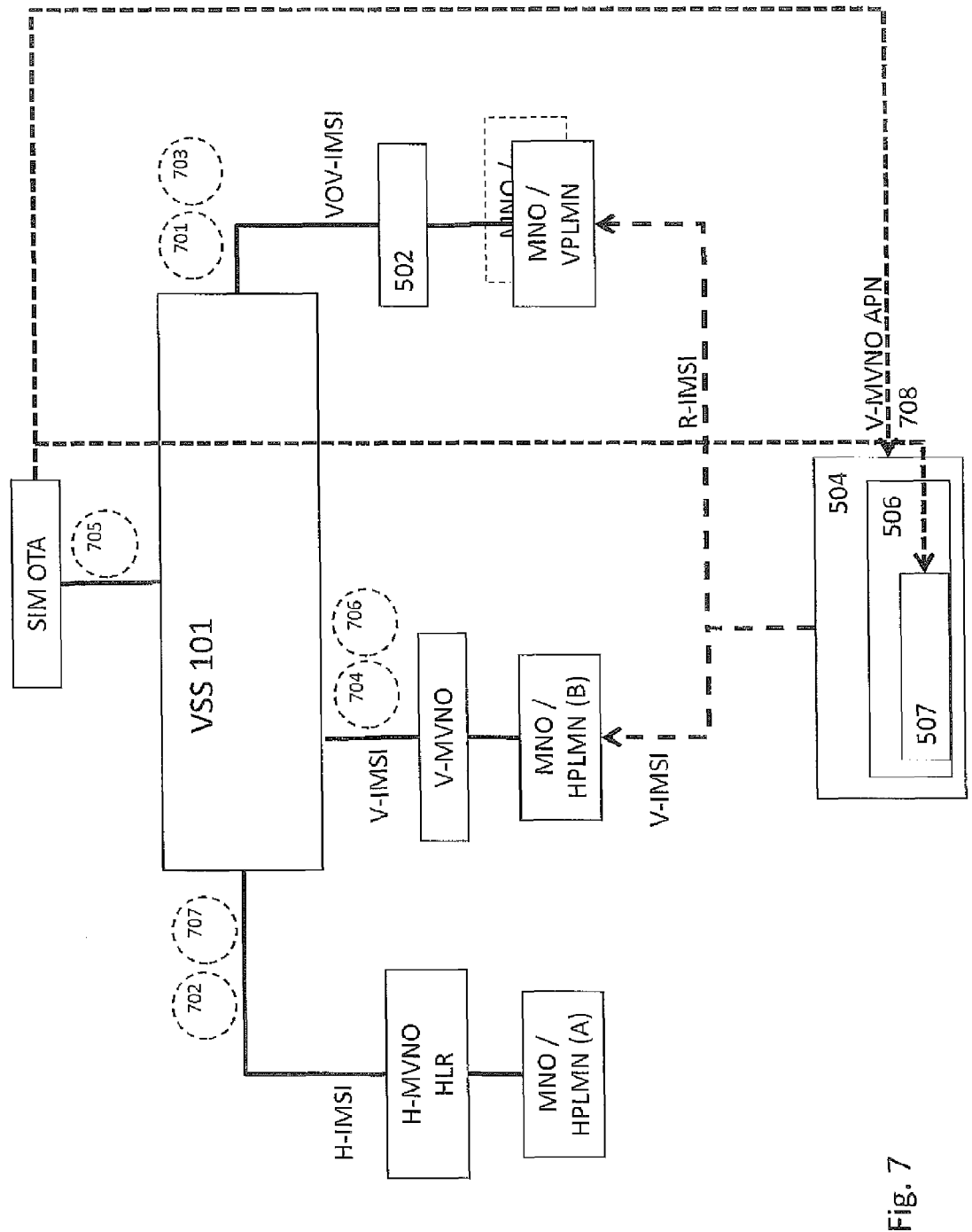
FIG. 7 is a schematic block diagram illustrating further aspects of a method for serving visitor subscribers, in particular the handling of a roaming event from a foreign network.

The method for Handle roaming events for a VOV is illustrated in FIG. 7. MVNOs will receive location management information from the mobile network operators as the subscriber moves to new areas. Subscribers visiting a foreign country will use a roaming hub 502 for world-wide roaming coverage. The roaming hub IMSI (R-IMSI) will be used for network entry in foreign countries in order to get network access. The VRC will detect the roaming event on the VOV-IMSI (step 701). The authentication towards his H-MVNO is performed based on the H-IMSI (step 702) and the response is forwarded to the roaming hub 502 (step 703).

The VRC will request a visitor subscription from the MVNOs and receive a free visitor subscription from the MVNO covering the area (step 704). A VOV will be assigned an IMSI from the V-MVNO. An IMSI sub-range with associated MSISDNs is allocated for VOV subscribers in each of the participating MVNOs. The IMSI sub-range is used as a pool of V-IMSIs for visitor subscriptions. The visitor subscriptions are inserted in the MVNO's HLR.

The V-IMSI for the VOV is automatically assigned to the visiting subscriber as the subscriber moves to an area covered by a MVNO. The new visitor subscription profile (step 708) will be sent to the Visitor Applet 507 on the subscriber SIM card 506 through the SIM OTA (step 705). The roaming partner network will be used to update the Visitor Applet on the SIM card with V-IMSI.

Reception of the visitor subscription profile with IMSI/PLMN & routing parameters will trigger a restart of the network selection process in the MS based on the new IMSI. SIM OTA will in addition update the MS with the V-MVNO APN.

The VOV subscriber MS SIM-card will use the assigned V-IMSI for accessing the local H-PLMN in the visited country. The VOV subscriber V-IMSI will be inserted in the visited H-PLMN/MNO VLR. The V-MVNO's HLR will keep track of the visitor subscription status in a similar way as for own subscribers turning on and off their mobile phone.

A VOV will be identified with the V-IMSI and the associated V-MSISDN. Location updates on the V-IMSI sub-range is forwarded towards the VRC.

All subscribers in the VOV subscriber pool will make use of the IN service and the VGw will be the IN node address. The APN address for local breakout of data communications will be the local MVNO GGSN. Signalling on the V-IMSI sub-range is forwarded towards the VRC (step 706).

The Visitor subscription mapping in the VRC will perform the mapping between the VOV subscriber and the Home subscriber identity.

The VOV subscriber MS SIM-card will use his home operator private key for authentication. The V-MVNO will redirect the messages associated with the visitors towards the visitor home operator. The VOV will be authenticated towards his H-MVNO's HLR based on his H-IMSI and key. The home operator will manage his own VOV subscribers in a similar as way as subscribers roamed to another PLMN (step 707).

Figure 8:
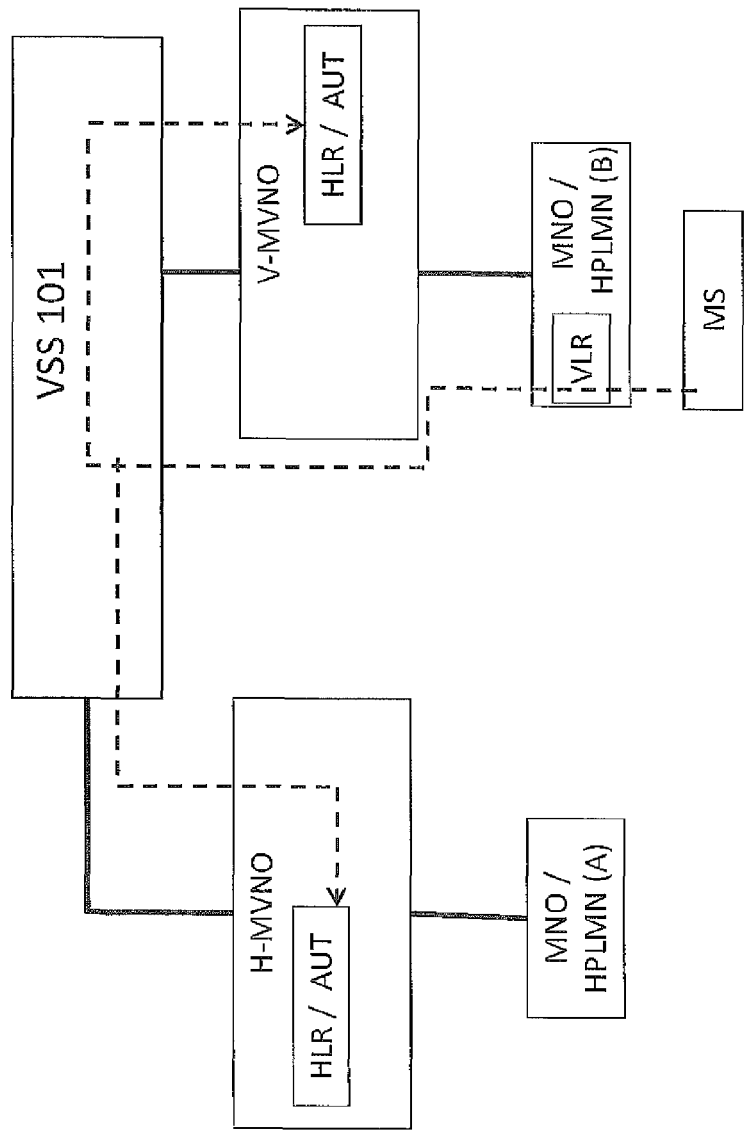
FIG. 8 is a schematic block diagram illustrating further aspects of a method for serving visitor subscribers, in particular an authentication process.

The authentication process is shown in more detail in FIG. 8. In order to authenticate the MS by the VLR in the serving network (HPLMN (B) in this case) a set of one to five authentication vectors is sent from HLR/AUT in the home MVNO to VLR. The HLR/AUT in the visited MVNO will also be requested for the authentication vectors keys related to the visitor subscription. These parameters will not be used, but the HLR in the visited MVNO will be informed that the VOV is now active and connected to the local HPLMN (B).

The MS will continue to use the R-IMSI in areas without a local V-MVNO. If there are no free visitor subscription covering the area and the area is not the HPLMN of the H-MVNO, the MS will continue to use the R-IMSI. Step (705-707) will not be performed.

Figure 9:
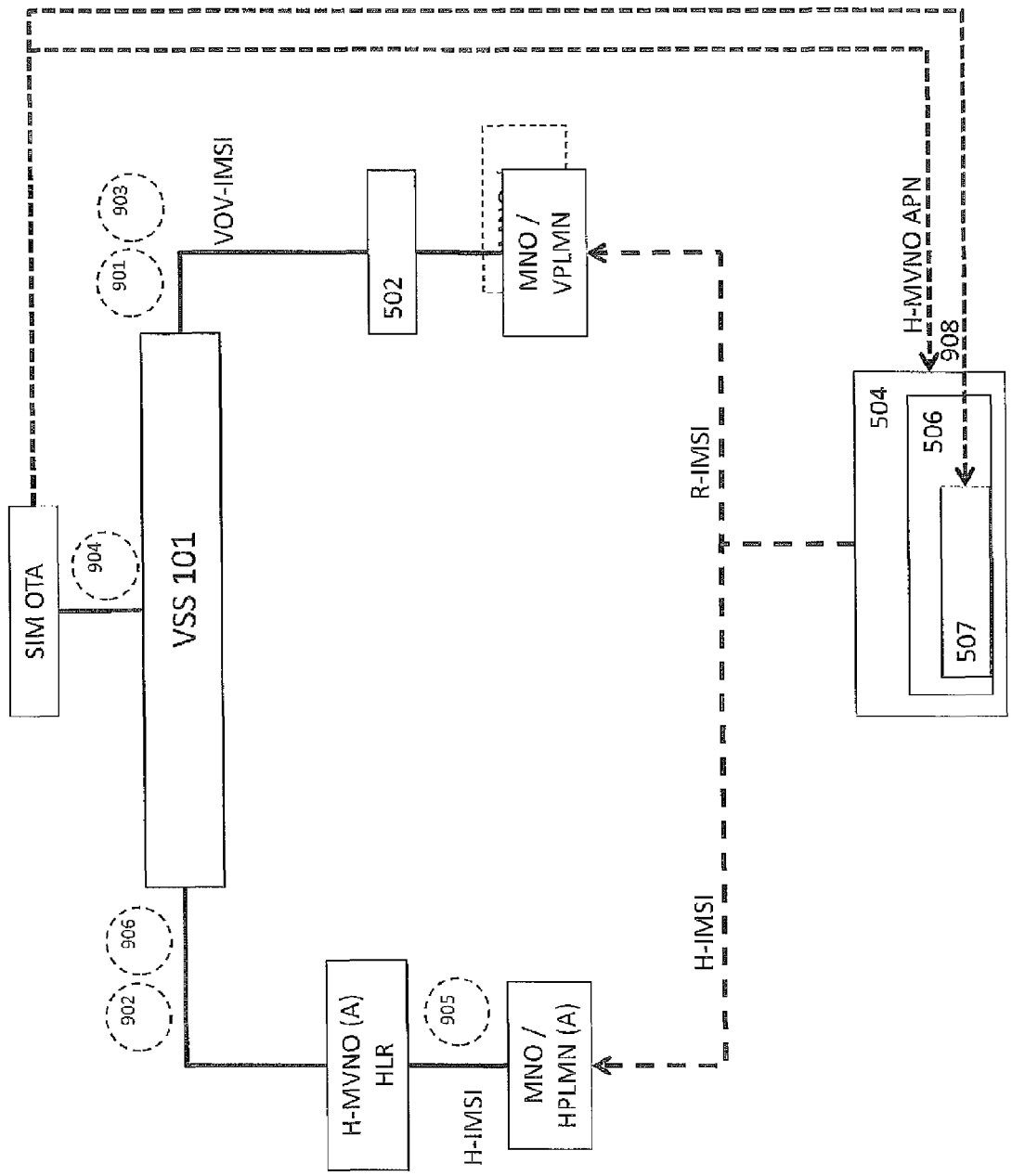
FIG. 9 is a schematic block diagram illustrating further aspects of a method for serving visitor subscribers, in particular the handling of a roaming event from home network.

The MS will use the H-IMSI and H-MVNO'S APN in areas covered by the home mobile network operator HPLMN (FIG. 9)

The VRC will detect the roaming event on the VOV-IMSI (step 901). The authentication towards his H-MVNO is performed based on the H-IMSI (step 902) and the response is forwarded to the roaming partner (step 903).

The VRC will use the area information to determine the H-MVNO as the preferred operator and in case the subscriber has entered an area covered by the HPLMN (A): the SIM card shall use the H-IMSI.

The H-IMSI identifier is sent to the Visitor Applet on the subscriber SIM card through the SIM OTA (step 904). The roaming hub network (cf. roaming hub 502) will be used to update the Visitor Applet 507 on the SIM card 506. Reception of the H-IMSI identifier will trigger a re-start of the network selection process in the MS based on the pre-stored H-IMSI profile. SIM OTA will in addition update the MS with the V-MVNO APN. The authentication towards his H-MVNO is performed based on the H-IMSI (step 905). In FIG. 9, 908 denotes home subscription profile.

Figure 10:
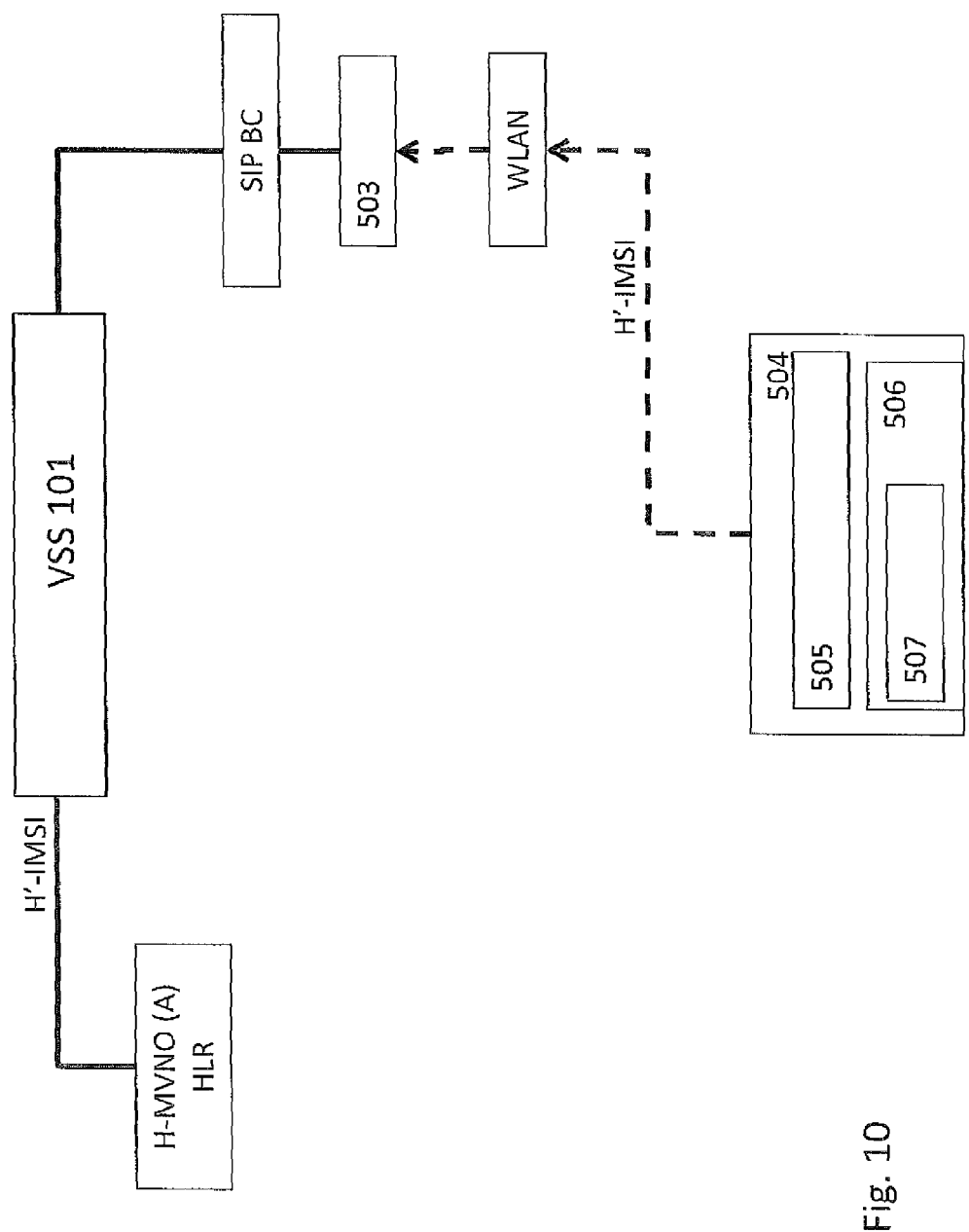
FIG. 10 is a schematic block diagram illustrating further aspects of a method for serving visitor subscribers, in particular the handling of a roaming event from WLAN.

The Visitor SIP client will make use of the H'-IMSI for log-on to the SIP server (FIG. 10). The SIP server is operated as an IP telephony virtual network operator that redirects the SIP log-on towards the subscriber H-MVNO given by the H'-IMSI. The H-MVNO receives a normal roaming event from the VRC and will update the HLR accordingly. In FIG. 10, 503 denotes Internet, 504 denotes mobile station, 505 denotes visitor SIP client, 506 denotes SIM card, 507 denotes visitor applet.

FIGS. 6-10 give a conceptual overview of aspects the present invention. The following disclosure will give further detailed descriptions of possible steps involved for various mobile services. Those skilled in the art will see that subsets of available mobile services are discussed, but it is understood that small modifications to the methods for those services discussed will cover other mobile services as well.

MAP Handling

Figure 11:
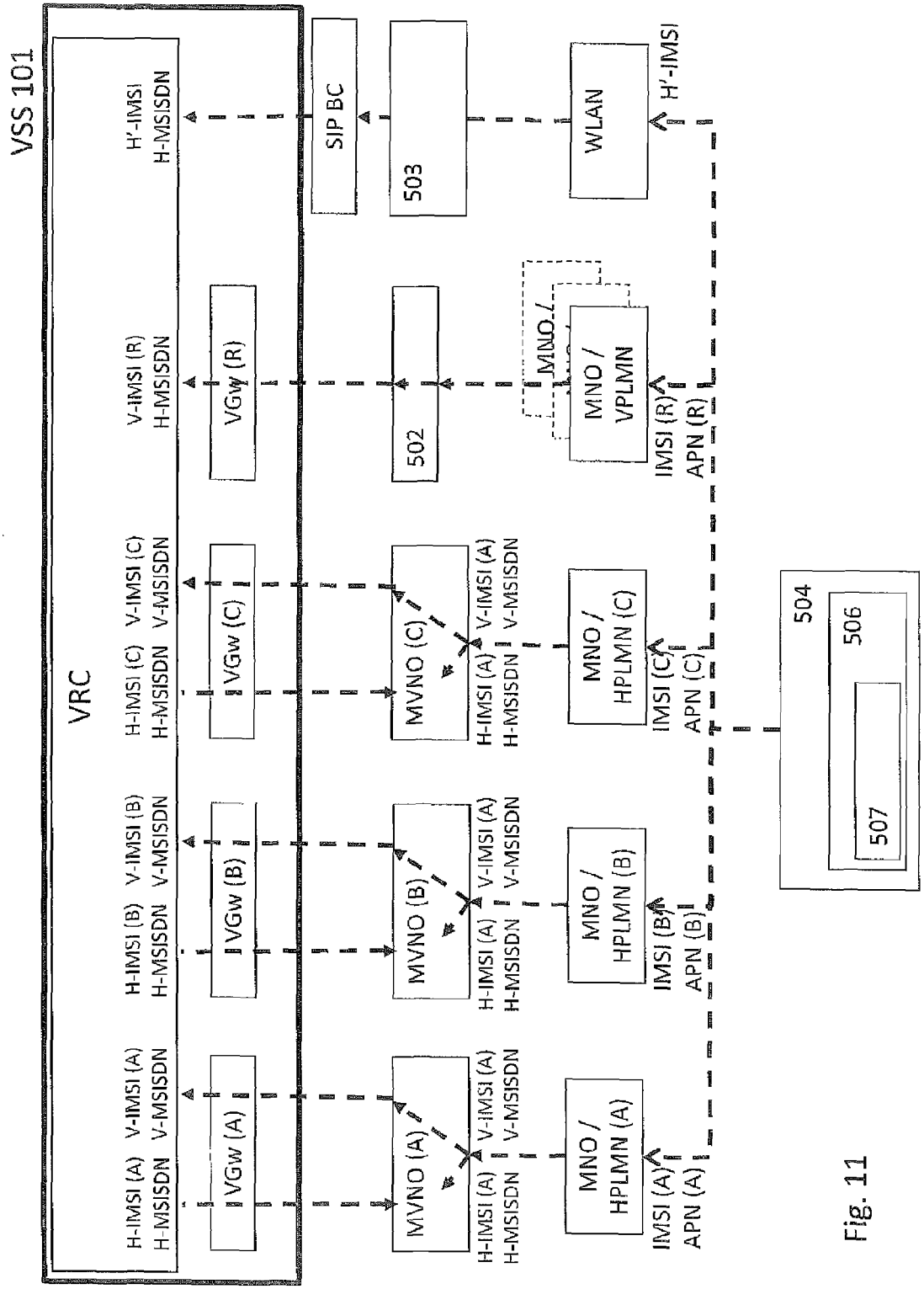
FIG. 11 is a schematic block diagram illustrating aspects of MAP handling.

FIG. 11 illustrates the MAP handling. MAP signaling is used between MCS/VLR/SGSN in the serving network and GMSC/HLR/GGSN in the home network. For visitor subscriptions, the related MAP signaling will not be between the serving network and the visitor subscription's home network, but between the serving network and the home subscription's home network. Instead of using the SS7 network, these MAP messages are routed via VGw and VRC through the VOV network.

The MAP signaling covers the following services:
Mobility and O&M
Short Message Service (SMS) Handling
Call Handling
Supplementary services
GPRS services
Location services In FIG. 11, 502 denotes roaming hub, 503 denotes Internet, 504 denotes mobile station, 506 denotes SIM card, 507 denotes visitor applet.

Figure 12:
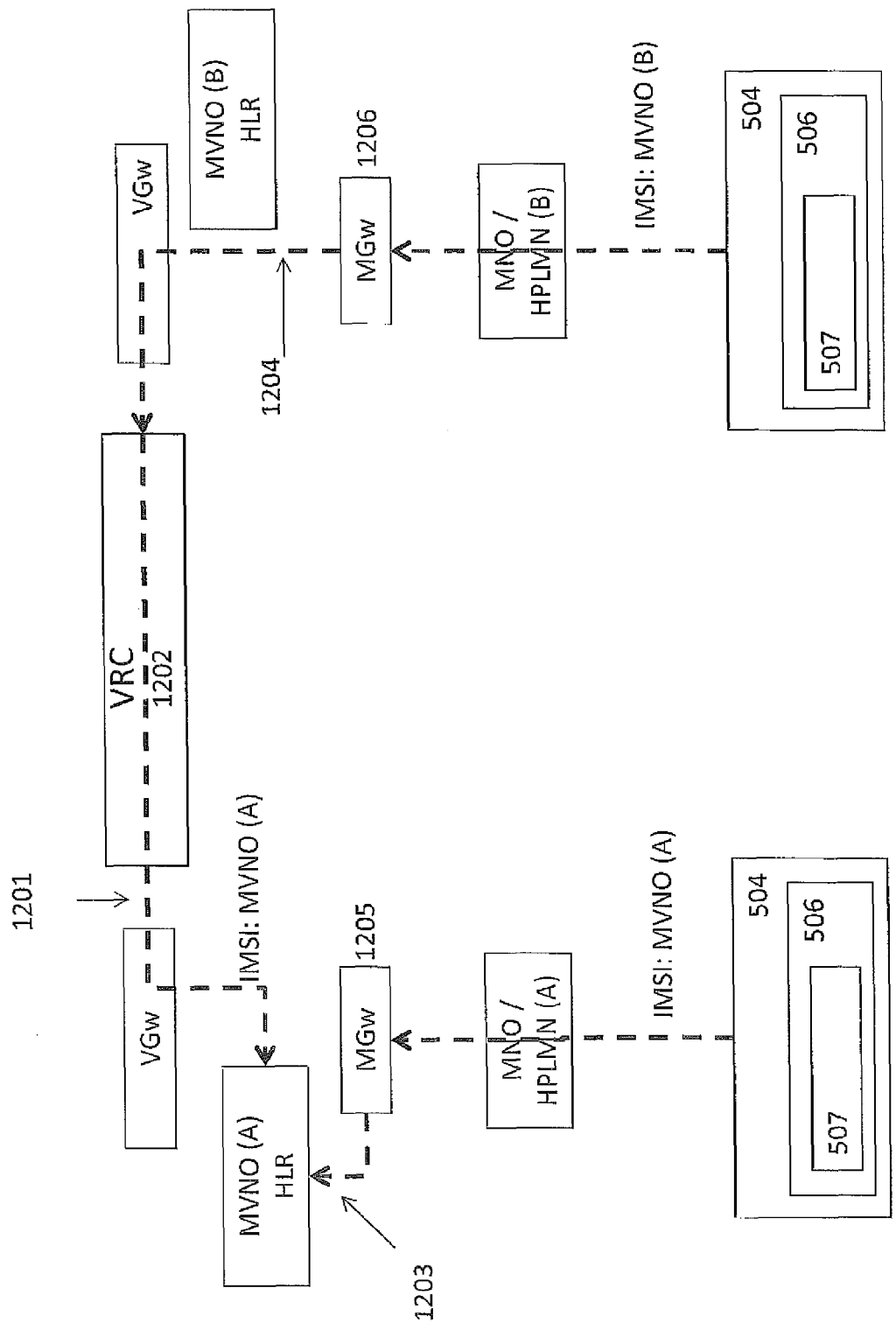
FIG. 12 is a schematic block diagram illustrating further aspects of MAP handing, in particular the routing of MAP messages.

In order to route the messages to VGw, SCCP Relay Point (SRP) functionality is utilized. SRP has the ability to process the SCCP part of the message. Media gateways (MGw) support Global Title (GT) analysis in the SRP function and can be configured to route messages to VGw. This is illustrated in FIG. 12. The following GT is routed to VGw:
V-IMSI
V-MSISDN
Direct ISDN-number to VGwIn FIG. 12, 504 denotes mobile station, 506 denotes SIM card, and 507 denotes visitor applet. Further, 1201 denotes MAP related to own subscribers visiting another network, 1203 denotes MAP related to own subscribers, and 1204 denotes MAP related to visitor subscribers. 1205 and 1206 denote GT routing. VRC 1202 may be further described by visitor subscription mapping.

Handle Roaming Events

Roaming events will be detected in order to send out new SIM/Device data to the MS. OTA is used for dynamic updating of SIM and Device data as illustrated in FIG. 7.

The roaming events from Roaming Hub are detected by VRC. If a VOV MVNO is found in the country where the roaming events come from, a V-IMSI is allocated and sent to the OTA. OTA will send V-IMSI and other SIM/Device data to the MS.

The SIM card contains three IMSIs:
V-IMSI (dynamically updated via OTA)
R-IMSI (Static data)
H-IMSI (Static data)

In foreign countries, the MS will start with the R-IMSI.

VOV Subscriber at Travel with VOV MVNO Available

This example describes a signaling sequence related to a VOV subscriber at travel. The MS starts to use the R-IMSI. VLR in the serving network authenticate the MS by use of data fetched from H-HLR via the Roaming Hub and VRC/VGw. Both the Roaming Hub and the VRC change the IMSI, respectively to VOV-IMSI and H-IMSI.

The roaming event (MAP message: update location) is sent from VLR in the serving network to the Roaming Hub. The roaming partner changes IMSI and sends the MAP messages to VRC. VRC changes the VOV-IMSI to H-IMSI and sends the message to H-HLR via VGw. VGw/VRC mediates the subscriber data from the H-HLR to the VLR.

The roaming event contains a VLR number. This is an E.164 number and contains a country code. Via a DB lookup VRC checks whether there exist any VOV MVNO cover this area. In this case the VOV subscriber is roaming from a country with at least one VOV MVNO. One of the VOV MVNOs is selected due to predefined configuration data. VRC allocates a free V-IMSI for this MVNO. VRC sends the V-IMSI together with an APN parameter for GPRS break out to the OTA system. This system pushes SIM/Device data and other SIM data to the MS via SMS transport.

Subscriber at Home with R-IMSI

This example scenario describes a signaling sequence related to a VOV subscriber turning on the MS at home after being on travel, visiting a VOV MVNO. The MS starts to use the R-IMSI. The roaming event (MAP message: update location) is sent from VLR in the HPLMN to the Roaming Hub. The roaming partner changes IMSI and sends the MAP messages to VRC. VRC detects this roaming event and discovers that the event was originated in the home network. VRC sends the H-IMSI together with the home APN parameter to the OTA system. This system pushes SIM/Device data to the MS by via SMS transport.

Subscriber at Travel with Roaming Hub IMSI and No VOV MVNOs Available

This example describes a signaling sequence related to a VOV subscriber at travel, but in this case the VOV subscriber roams from a country with no VOV MVNO. The MS starts to use the R-IMSI. The roaming event (MAP message: update location) is sent from VLR in the serving network to the Roaming Hub. The Roaming Hub changes IMSI and sends the MAP messages to VRC. VRC detects this roaming event and checks where the event was originated. In this case no VOV is found and the MAP message is sent further to the H-MVNO's HLR. The IMSI is changed to the corresponding H-IMSI before it is sent to the HLR. The rest of the sequence authenticates the VOV subscriber in the serving network from the home H-MVNO's HLR.

Update Location

Update Location procedure takes place when the MS is turned on. As soon as the MS is switched on it informs the VLR in the serving network. VLR uses the received IMSI from MS to address the HLR for authentication and subscriber data. If the IMSI is a V-IMSI belonging to the local VOV MVNO, an update location message is sent to VGw and routed to the HLR in the home network via the VOV network. If the IMSI is an H-IMSI the update location message is routed to the Home HLR via the international SS7 network.

Update Location when a VOV Subscriber is at Travel

This example scenario describes the signaling sequence related to a VOV subscriber at travel and after the sequence VOV Subscriber at travel with VOV MVNO available has finished, i.e. this scenario starts after the MS has restarted with a V-IMSI belonging to the selected VOV MVNO in that country.

VLR in the serving network registers the IMSI attach and sends a map update location message using V-IMSI as GT. The SRP function in media gateway sends this to VGw and the message is routed to VRC via the VOV network. VRC replaces visitor IMSI with home IMSI and SGSN/MCS/VLR ids with H-VGw address in the MAP message: update location and routes it to the H-VGw via the VOV network. The TCAP Transaction ID, IMSI and MSC/VLR/SGSN-number are stored in the database. H-VGw then sends the message to the H-MVNO's HLR.

The responses are sent back the opposite way but now H-IMSI is substituted with V-IMSI. Otherwise, the sequence follows the standard update location sequences. In addition to the standard sequence, the HLR in the V-MVNO is updated with the standard update location sequence, but now VRC is simulating the VLR.

Update Location when a VOV Subscriber is Back Home from Travel

This scenario describes the signaling sequence related to a VOV at home after having visiting a VOV MVNO in a foreign country. This scenario starts after the sequence Subscriber at home with R-IMSI has finished, i.e. the MS has restarted with an H-IMSI belonging to the H-MVNO.

VLR in the hosting network registers the IMSI attach and sends a MAP update location message using H-IMSI as GT. The message is routed to H-MVNO's HLR. The HLR sends a MAP Cancel Location message to previous VLR and use VGw as address. The Cancel Location message is sent to VRC and VRC substitutes H-IMSI with V-IMSI and routes it to V-VGw. V-VGw sends the MAP Cancel Location message to VLR in the serving network. The response message is routed back to VRC and further back to H-MVNO's HLR. VRC then sends the MAP message: PurgeMS to V-MVNO's HLR to indicate that the visitor subscriber is no longer available. The last thing VRC has to do in this scenario is to send the H-MVNO's APN parameter to the OTA system. This system will then update the MS with this parameter.

Mobile Originated Short Message Transfer

SMS Originated from VOV Subscriber at Travel

The mobile originated short message transfer sequence in this example describes the forwarding of a short message from a MS to a SMSC. In this case the sending VOV subscriber is at travel in a country with a VOV MVNO.

The MS has received a V-IMSI and new SC address during the scenario described in "VOV Subscriber at travel with VOV MVNO available". The SMSC address is the same as the V-VGw address for the visited VOV MVNO. The serving MSC or SGSN sends the MAP message mo-forwardSM request to V-VGw since the SC address is used as GT. The message is sent further to VRC.

The following mapping is done in VRC:
IMSI: V-IMSI to H-IMSI
SM RP DA: V-VGw address to Home SC Address
SM RP OA: V-MSISDN to H-MSISDN
SM RP UI TP-OA: V-MSISDN to H-MSISDN The message is routed to H-VGw based on H-IMSI. The message is then routed to H-MVNO's HLR by using the H-MVNO's SMSC Address.

The response message is sent back the opposite way.

Mobile Terminated Short Message Transfer

SMS Terminates at a VOV Subscriber at Travel. Sending and Receiving Subscriber has Subscriptions in the Same VOV MVNO The mobile terminated short message transfer sequence in this example describes the forwarding of a short message from a SMSC to a MS. The B-subscriber is at travel and belongs to the same MVNO that the A-subscriber.

GMSC at H-MVNO requests H-MVNO's HLR for routing information by sending the MAP message: SRI-SM request with the B-subscriber's MSISDN. HLR responds with the H-VGw address. GMSC sends the MAP message: mt-forwardSM request to H-VGw by using H-VGw address as GT. The message is sent further to VRC.

The following mapping is done in VRC:
SM RP DA: H-IMSI to V-IMSI
SM RP OA: SMCS Address to V-VGw Address
SM RP UI TP-DA: H-MSISDN to V-MSISDN The MSC/SGSN number is retrieved from database in order to use direct routing to MSC/SGSN.

The database contains a mapping between V-IMSI and V-VGw address. VRC then sends the message to V-VGw. V-VGw sends the message further to MSC/SGSN in the serving network. The message is routed by using MSC/SGSN address as GT.

The response message is sent back the opposite way.

SMS Terminates at a VOV Subscriber at Travel. Sending and Receiving Subscriber has Subscriptions in Different VOV MVNOs The mobile terminated short message transfer sequence in this example describes the forwarding of a short message from a SMSC to a MS. The B-subscriber is at travel and belongs to a different MVNO than A-subscriber.

The following mapping is done in VRC:
SM RP DA: H-IMSI to V-IMSI
SM RP OA: SMSC Address to V-VGw Address
SM RP UI TP-DA: H-MSISDN to V-MSISDN The MSC/SGSN number is retrieved from database in order to use direct routing to MSC/SGSN.

The database contains a mapping between V-IMSI and V-VGw address. VRC then sends the message to V-VGw. V-VGw sends the message further to MSC/SGSN in the serving network. The message is routed by using MSC/SGSN address as GT.

The response message is sent back the opposite way.

Call Handling

General

Each VOV subscriber visiting another VOV MVNO (V-MVNO) will be allocated a local visitor mobile subscriber profile (with V-IMSI and V-MSISDN). Such profiles will have IN/CAMEL activated with the local V-VGw as IN/CAMEL server.

The HLR for a VOV subscriber visiting a V-MVNO will have the subscriber's H-VGw ISDN stored as VLR no.

Mobile operators offering access for VOV subscribers are interconnected through the VRC. Both MO and MT calls from a VOV will be routed through the H-MVNO.

Figure 13:
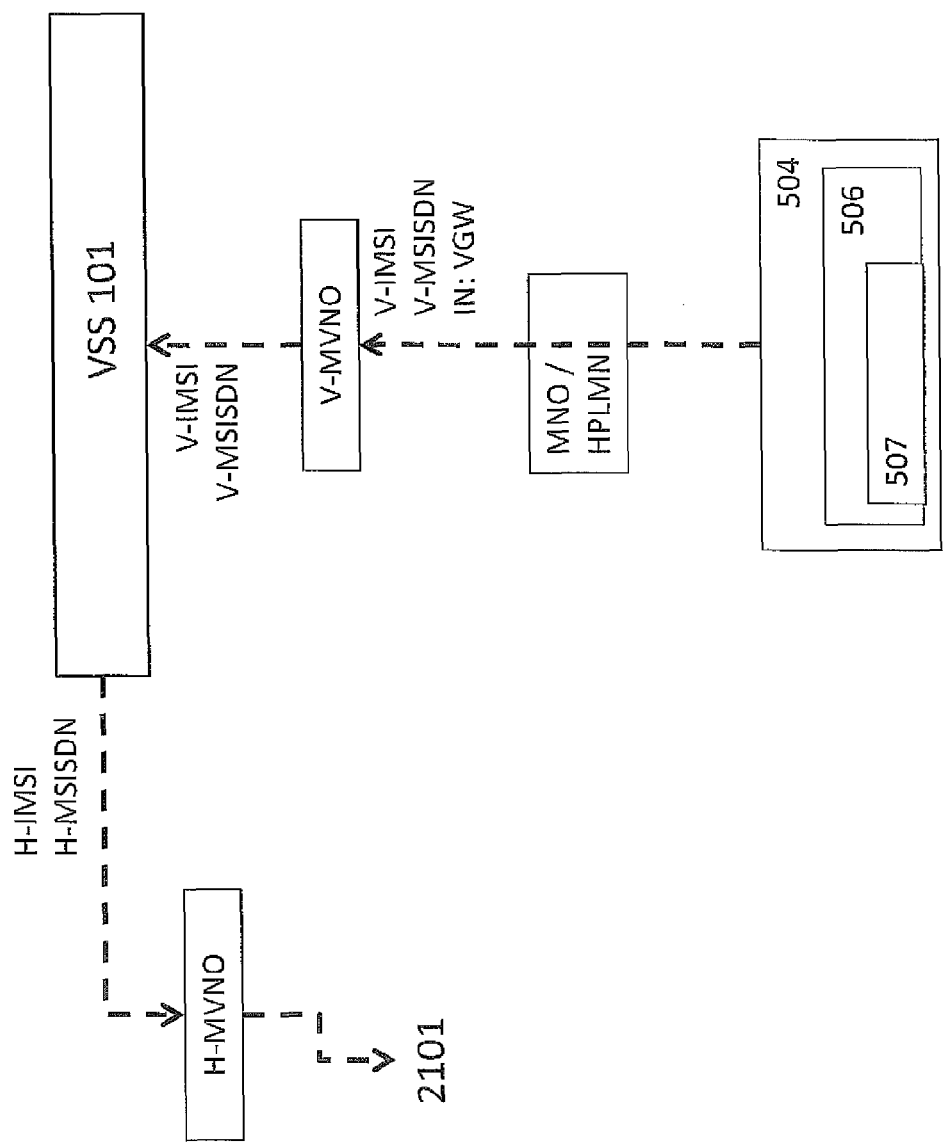
FIG. 13 is a schematic block diagram illustrating aspects related to mobile originated call from a virtual operator visitor subscriber.

FIG. 13 gives a conceptual overview of a MO VOV call. A MO call from a VOV subscriber at travel will be routed from the V-MVNO towards his H-MVNO. The H-MVNO's GMSC will perform the B-number analyses and route the call towards the called subscriber 2101 or service. The method for mapping between the H-IMSI/H-MSISDN and the V-IMSI/V-MSISDN, the special VOV prefixes and VOV routing rules are further elaborated in the sections below.

In FIG. 13, 504 denotes mobile station, 506 denotes SIM card, and 507 denotes visitor applet.

Figure 14:
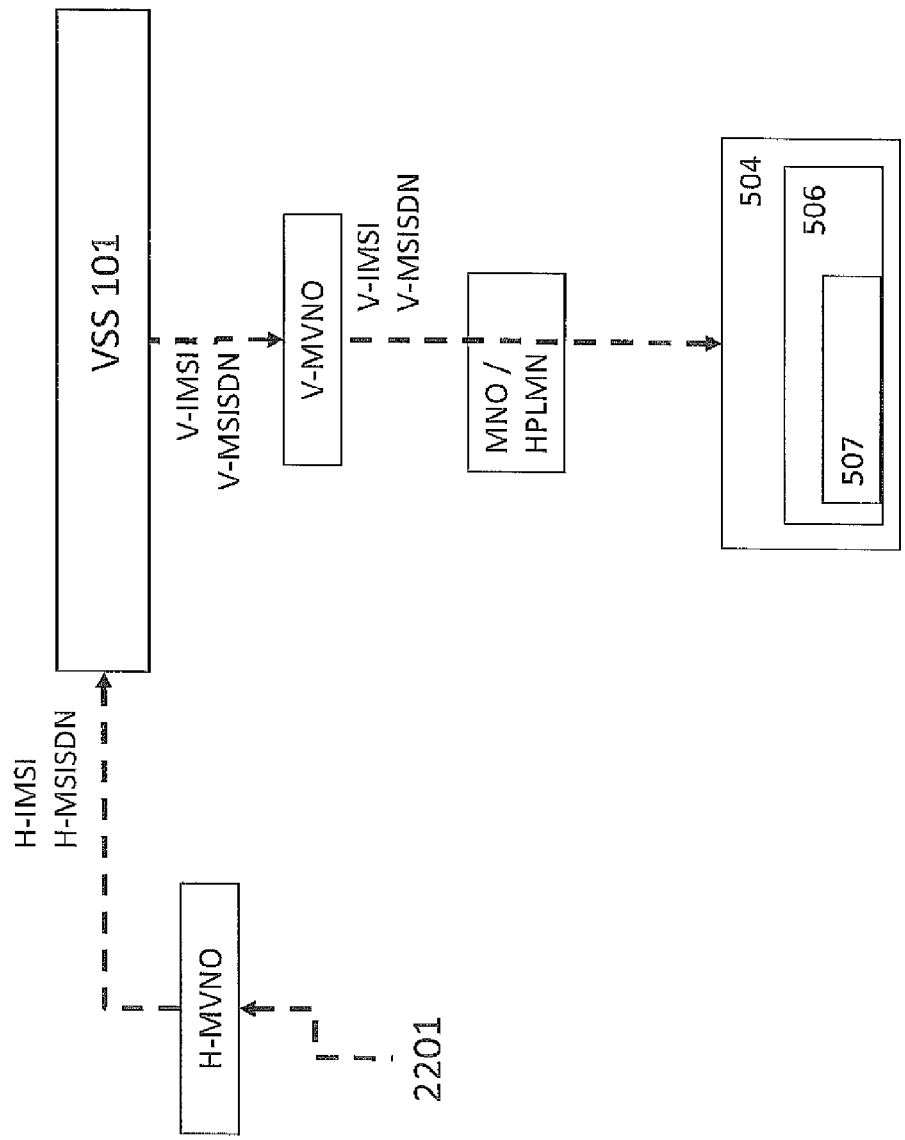
FIG. 14 is a schematic block diagram illustrating aspects related to mobile terminated call handling to a virtual operator visitor subscriber.

FIG. 14 gives a conceptual overview of a MT VOV call. A MT call towards a VOV subscriber at travel (calling subscriber, 2201) will be received by the H-MVNO. The H-MVNO's HLR knows that the subscriber is roamed to the VVS and the call will be directed towards the H-VGw and routed to the V-MVNO. The method for mapping between the H-IMSI (roamed)/H-MSISDN and the V-IMSI/V-MSISDN, the special VOV prefixes and VOV routing rules are further elaborated in the sections below.

In FIG. 14, 504 denotes mobile station, 506 denotes SIM card, and 507 denotes visitor applet.

FIGS. 13 and 14 give a conceptual overview of aspects of the present invention. The following disclosure will give further, detailed descriptions of possible steps involved for various call handling scenarios. Those skilled in the art will see that subsets of available mobile services are discussed, but it is understood that small modifications to the methods for those services discussed will cover other mobile call handling scenarios as well.

V-MSISDNs will be assigned to the V-IMSI sub-range. An IN service activation in the VOV subscriber profile will ensure that call signaling from the visitors will be filtered out and forwarded to the VGw.

The V-IMSI is replaced with the associated H-IMSI and vice versa. For signaling messages containing the MSISDN, the V-MSISDN will be replaced with the H-MSISDN in order to ensure that the V-MSISDN never appears as the A-number in calls received from the VOV subscriber.

Special VOV Prefixes

A set of special VOV prefixes are defined (globally unique or configurable per VOV MVNO). The following VOV prefixes are used:

o Originating.
   Prefix "o" is added by the IN/CAMEL-server function of the local VGw in the response to an IN/CAMEL information request for a call from a visiting VOV subscriber. All visiting VOV subscriber profiles (i.e. for all V-IMSI/V-MSISDN profiles) must have IN enabled with the local V-VGw as IN-server.
r Terminating at Roaming Hub.
   Prefix "r" is added by VRC in the response to a MAP-PRN from an HLR for a VOV subscriber on travel to a Roaming Hub.
w Terminating at WLAN.
   Prefix "w" is added by VRC in the response to a MAP-PRN from an HLR for a VOV subscriber using WLAN-access.
v Terminating is visitor in VOV network.
   Prefix "v" is added by VRC in the response to a MAP-PRN from an HLR for a VOV subscriber on travel to another VOV MVNO.

GMSC Call Routing

The GMSC in each VOV MVNO will be configured to route all calls with CdPN starting with one of the special VOV prefixes to its local VGw.

The GMSC in each VOV MVNO will also route all calls where the CdPN is an international number (i.e. which does not belong to own MVNO to its local VGw.

VOV Routing-Rule Parameter

A special SIP-header Subject field with a routing rule parameter is transferred when needed between VGw and VRC. The following routing-rule values are used:
routing-rule-o Set by VGw when CdPN contains prefix=o.
routing-rule-r Set by VGw when CdPN contains prefix=r.
routing-rule-w Set by VGw when CdPN contains prefix=w.
routing-rule-v Set by VGw when CdPN contains prefix=v.
routing-rule-ro Set by VRC-VGw when sending INVITE from roaming partner to VRC.
routing-rule-wo Set by SBC when sending INVITE to VRC.
routing-rule-i Set by VRC when sending INVITE to VGw if VGw shall send it to V-GMSC instead of PSTN.
routing-rule-int Set by VGw when CdPN contains an unknown prefix. Used by VRC. Note that the value "routing-rule-int" is never set when a SIP-Provider is used.

The usage of the routing-rule parameter is further described in the call setup sequences below.

Call Setup Sequences

Originating and Terminating Sequences

The sections below with referred sequences describe the originating side and the terminating side of a call set-up when a VOV subscriber is involved. A VOV subscriber can be at home or on travel. A call set-up involving a VOV subscriber is always routed through the subscriber's H-MVNO.

Only the IAM/INVITE part of the call setup have been discussed in the examples, since the rest of the call setup and release signalling follows the same principles and should be straightforward.

MO Call from VOV Subscriber on Travel to V-MVNO

In this example, an originating call from a VOV subscriber will trigger a CAMEL information request to the local V-VGw$_A$. The V-VGw$_A$ will add the special VOV prefix "o" to the Called Party Number (CdPN).

V-GMSC$_A$ will route a call with CdPN starting with prefix "o" to V-VGw$_A$ (e.g. using the BICC protocol).

V-VGw$_A$ will remove the prefix "o" from the CdPN, add a special "Routing-Rule" Subject field with value "routing-rule-o" in the SIP-header, and forward the call to VRC (e.g. using SIP).

VRC will, since "routing-rule-o" is present, change the calling party number from V-MSISDN to H-MSISDN, replace "routing-rule-o" with "routing-rule-i", and ask V-VGw$_A$ to route the call to H-VGw$_A$.

V-VGw$_A$ will then forward the call to H-VGw$_A$ (e.g. using SIP-I with the IAM-message embedded).

H-VGw$_A$ will, since "routing-rule-i" is present, forward the call to H-GMSC$_A$ (e.g. using BICC signaling).

H-GMSC$_A$ will route the call to H-MVNO$_B$ using the "VOV transit" procedure below. The transit procedure is skipped and the "MT to VOV" procedure is used instead if H-MVNO$_A$ is the same as H-MVNO$_B$.

MT Call to VOV Subscriber on Travel to V-MVNO

In this example, H-GMSC$_B$ will ask its HLR through a MAP Send Routing Info (SRI) request message to get a Mobile Roaming Subscriber number (MSRN) for the called subscriber. The HLR will have H-VGw$_B$ stored as VLR for this subscriber and will send a MAP Provide Routing Number (PRN) request message to H-VGw$_B$.

H-VGw$_B$ forwards the PRN message to VRC which will send back the V-MSISDN with a special VOV prefix "v" in front as MSRN.

H-GMSC$_B$ will send the call to H-VGw$_B$ since the CdPN starts with the special prefix "v".

H-VGw$_B$ will remove the prefix "v", add a SIP-header Subject field with value "routing-rule-v", and forward the call to VRC using SIP.

VRC will, since "routing-rule-v" is present, change the called party number from V-MSISDN to H-MSISDN, and ask H-VGw$_B$ to route the call to the V-VGw$_B$.

V-VGw$_B$ will forward the call to V-GMSC$_B$, e.g. using BICC signaling.

V-GMSC$_B$ will route the call to V-MNO$_B$.

GPRS Handling

The VOV will make use of the V-MVNO GGSN for local breakout of data services. MSISDN in the MMS will be replaced by the H-MSISDN before the message is transmitted towards the called subscriber, see FIG. 15.

If the VOV subscriber is roaming via Roaming Hub then a GGSN in the VOV network is terminating the GRPS tunnels.

Figure 15:
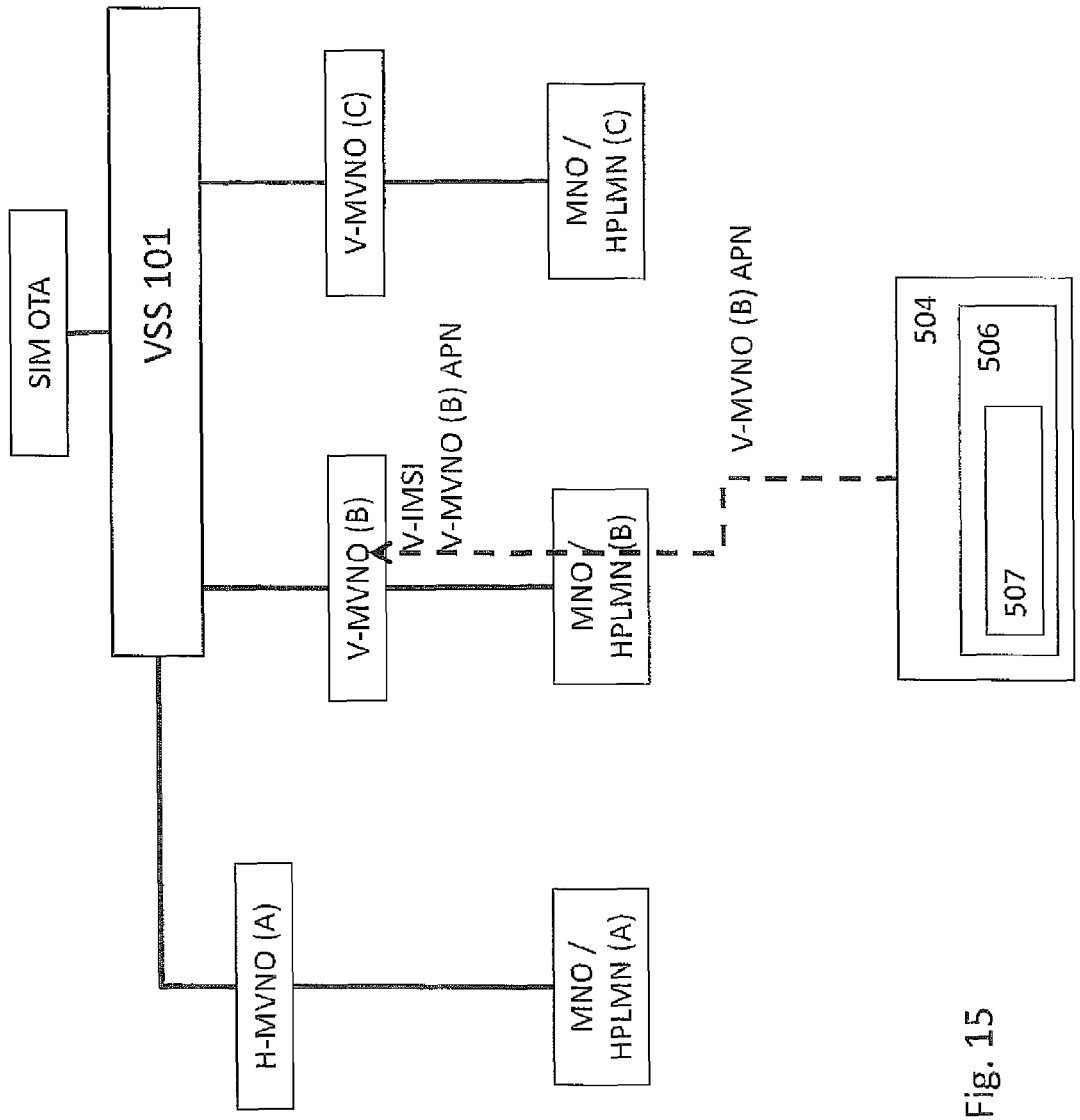
FIG. 15 is a schematic block diagram illustrating aspects related to handling data services, e.g., GPRS data.

In FIG. 15, 504 denotes mobile station, 506 denotes SIM card, and 507 denotes visitor applet.

Mobile Originated MMS

MMS Originates from a VOV Subscriber at Travel.

In this example, the mobile originated MMS transfer sequence describes the forwarding of a MMS from a MS to a MMS Relay/Server. In this case the sending VOV subscriber is at travel in a country with a VOV MVNO.

The MMS is forwarded to the visitor MMS Relay/Server. However, the Sender Address is the V-MSISDN. A "User-Based Trigger on MM1 Submission" for all existing V-MSISDN in the MMS Relay/Server enables a MM10 interaction. A MSCF in VRC changes the Sender Address to H-MSISDN before the visitor MMS Relay/Server sends the MMS message.

CDR Handling

The CDRs related to the visitors will be collected from a visited MVNO. A VOV may be identified either as the calling number or the called number in the CDR. The following types of CDRs may be collected:

| Activity | Entity | CDR type |
| --- | --- | --- |
| MO call | VMSC | Mobile-originated call attempt ('MOC CDR') |
| Roaming call | VMSC, GMSC | Mobile-roaming call attempt ('Roaming CDR') |
| MO-SMS | MSC | Short message service, mobile-originated ('SMS-MO CDR') |
|  | SGSN | SGSN short message, mobile-originated ('S-SMO-CDR') |
| GPRS session | SGSN | Mobile station mobility management data in SGSN ('M-CDR') |
| PDP Context | SGSN | SGSN PDP context data ('S-CDR') |
|  | GGSN | PDP context charging data in GGSN ('G-CDR') |

However, since the VOVs are identified through visitor MSISDN/IMSI in the collected CDRs, there is a need to pre-process the CDRs before performing the subsequent billing processes, such as rating and charging. This pre-processing is called normalization.

The normalization process adds normalized data to the CDR, such as home MSISDN/IMSI. One purpose of the normalized data is to give the processes after the normalization process enough data to perform operations on the CDR without having to look up cross references in other tables, to allow queries like which subscriber was actually visiting MVNO X calling subscriber Y, and to allow the home MVNO to perform rating and charging on its home subscriber.

The normalized CDR is sent further to the home MVNO, identifying the subscriber submitted to charging.

The invention has been described above as exemplary detailed embodiments. People skilled in the art will recognize that many alterations and variations are possible within the scope of the appended claims.

TERMINOLOGY AND ACRONYMS

General Terminology
CdPN Called Party Number
CgPN Calling Party Number
GGSN Gateway GPRS Support Node
GMSC Gateway Mobile Switching Center
GT Global Title
HLR Home Location Register
HPLMN Home PLMN
HSS Home Subscriber Server
IMSI International Mobile Subscriber Identity
MAP Mobile Application Part, SS7 protocol which provides an application layer for the various nodes in GSM and UMTS mobile core networks.
MGw Media Gateway
MME Mobility Management Entity
MMSC Multimedia Messaging Centre
MNO Mobile Network Operator is a of wireless communication service provider that owns the radio spectrum or wireless network infrastructure.
MO Mobile Originated
MSC Mobile Switching Center
MSCF Messaging Service Control Function
MSISDN Mobile Subscriber Integrated Services Digital Network Number alias Mobile Station International Subscriber Directory Number
MSRN Mobile Subscriber Roaming Number
MT Mobile Terminated
MS Mobile Station
MVNO Mobile Virtual Network Operator is a wireless communication service provider that does not own the radio spectrum or wireless network infrastructure.
P-GW PDN Gateway
PLMN Public Land Mobile Network
PSTN Public Switched Telephone Network
SMSC Short Messages Service Center
SGSN Service GPRS Support Node
S-GW Serving Gateway
VMSC Visiting Mobile Switching Center
VPLMN Visitor PLMN Special Terminology
A-/$_A$ Originating side (A-side, Calling subscriber's side) ex. A-no, H-MVNO$_A$, V-MVNO$_A$, V-VGw$_A$
B-/$_B$ Terminating side (B-side, Called subscriber's side) ex. B-no, H-MVNO$_B$, V-MVNO$_B$, V-VGw$_B$
H-GMSC Home VOV GMSC
H-HLR Home VOV HLR
H-IMSI Home IMSI
H'-IMSI Twin H-IMSI, used for WLAN access
H-MNO Home MNO, same as HMO
H-MSISDN Home MSISDN
H-MVNO Home VOV MVNO
H-VGw Home VGw
R-IMSI Roaming partner IMSI
R-MSISDN Roaming partner MSISDN
SBC SIP Boarder Controller
V-GMSC Visitor VOV GMSC
VGw Visitor Gateway
V-VGw Visitor VGw
V-IMSI Visitor IMSI
VLR Visitor Location Register
V-MNO Visitor MNO
V-MSISDN Visitor MSISDN
V-MVNO Visitor VOV MVNO
VOV Virtual Operator Visitor
VOV-IMSI Visitor IMSI for roaming partner
VOV MVNO A MVNO that can host VOVs by utilizing services from VSS.
VRC Visitor Routing Centre
VRC-VGw VGw collocated with VRC for roaming partner access
VSS Visitor Serving Subsystem VSS Network A private IP network connecting VOV MVNOs
V-VGw Visitor VGw

The invention claimed is:

1. A method for serving visitor subscribers in a mobile communication system, the method comprising the following steps, performed by a virtual visitor subsystem, VSS, included in the mobile communication system:
    detecting a roaming event on an MSISDN of a mobile station, MS, operating in the mobile communication system,
    determining a mobile network operator in the mobile communication system, having an HPLMN which covers a geographic area of the MS, to be a visitor mobile network operator of the MS,
    receiving a visitor IMSI from the visitor mobile network operator,
    assigning the visitor IMSI to the MSISDN of the MS,
    transmitting the visitor IMSI to the MS,
    intercepting an authentication initiation towards the visitor mobile network operator,
    authenticating the MS towards a home mobile network operator of the MS, and
    activating a visitor subscription identified by the visitor IMSI based on an authentication response received from the home mobile network operator,
    wherein the step of intercepting authentication initiation towards the visitor mobile network operator includes:
        intercepting by the VSS, an authentication request, and forwarding the authentication request towards the home network operator and the visitor network operator,
        intercepting, by the VSS, an authentication response received from the home network operator and the visitor network operator, and
        transferring, by the VSS, the authentication response from the home network operator towards the VLR requesting the authentication.

2. The method according to claim 1, further comprising performing a mapping between the visitor IMSI and a home IMSI of the MS, and authenticating the MS towards a home mobile operator of the MS, based on a home operator key.

3. The method according to claim 2, further comprising performing a further mapping between a visitor MSISDN and the MSISDN of the MS.

4. The method according to claim 3, further comprising transferring of a mobile originated SMS sent from the MS using the visitor IMSI and an SMSC of the home mobile network operator.

5. The method according to claim 3, further comprising transferring a mobile terminated SMS received by the MS temporarily using the visitor IMSI and an SMSC of the home mobile network operator.

6. The method according to claim 3, further comprising transferring a mobile originated MMS sent by an MMSC of the visitor mobile network operator and received by an MMSC of the home mobile network operator.

7. The method according to claim 3, further comprising adding routing prefixes to a B-number for transfer of mobile originated calls generated by a visitor assigned a visitor subscription to a GMSC of the home mobile network operator, utilizing the VSS as an IN node.

8. The method according to claim 3, further comprising adding routing prefixes to a roaming number for routing of mobile terminated calls towards the visitor mobile network operator, utilizing the MSISDN of the visitor subscription as the roaming number.

9. The method according to claim 3, further comprising transferring of voice billing data (MOC CDR) received from the visitor mobile network operator.

10. The method according to claim 3, further comprising transferring of SMS billing data (SMS-MO CDR/S-SMO-CDR) received from the visitor mobile network operator.

11. The method according to claim 3, further comprising transferring of MMS billing data (MO MMS CDR) received from the visitor mobile network operator.

12. The method according to claim 3, further comprising transferring of GPRS billing data (M-,S- and G-CDR) sent from the visitor mobile network operator.

13. The method according to claim 1, wherein the roaming event on an MSISDN of an MS is identified by:
    receiving, by the VSS, a MAP Update Location message from the roaming hub when the MS is connected to a visitor public land mobile network (VPLMN), or
    receiving, by the VSS, a MAP Update Location message from the roaming hub when the MS is connected to the home public land mobile network (HPLMN), or
    receiving, by the VSS, a MAP Cancel Location message from the home mobile operator of the MS when the MS is connected to the home public land mobile network (HPLMN).

14. The method according to claim 1, wherein the determining of a visitor mobile operator includes:
    determining a visitor mobile network operator as a mobile network operator having a HPLMN covering the geographic area of the MS, by using a VLR number in the roaming event.

15. The method according to claim 1, wherein the step of assigning the visitor IMSI to the MSISDN includes:
    selecting a free visitor IMSI from a visitor subscription pool stored in or retrieved from the visitor mobile network operator.

16. The method according to claim 1, wherein the step of transmitting the visitor IMSI to the MS includes:
    direct transfer of the service SMS to the MS without involving the home operator SMSC, and
    updating a SIM in the MS with the visitor IMSI by utilizing an application executed by a processing device in the SIM.

17. A processing device configured to perform the method as set forth in claim 1.

18. A visitor serving subsystem for serving visitor subscribers in a mobile communication system, including the processing device as set forth in claim 17.

19. A mobile communication system, comprising:
    a plurality of mobile stations, MS, each including a SIM, the SIM including an application to be executed by a processing device in the SIM;
    a plurality of mobile network operators (MVNOs and MNOs); each configured with a pool of visitor subscriptions, each visitor subscription being identified with a visitor IMSI;
    a plurality of home public land mobile networks, HPLMNs, each associated with a corresponding mobile network operator, each HPLMN being configured to determine a geographic area of an MS operating in the HPLMN;
    a plurality of visitor public land mobile networks, VPLMNs, associated with a roaming hub; and
    the visitor serving subsystem as set forth in claim 18.

* * * * *